United States Patent [19]

Knecht et al.

[11] Patent Number: 4,749,069

[45] Date of Patent: Jun. 7, 1988

[54] VIBRATION DAMPER FOR MOTOR VEHICLES HAVING AN ARRANGEMENT FOR VARYING DAMPING THEREOF

[75] Inventors: Heinz Knecht, Eitorf; Bernd Moser, Ham/Sieg, both of Fed. Rep. of Germany

[73] Assignee: Boge GmbH, Eitorf, Fed. Rep. of Germany

[21] Appl. No.: 915,265

[22] Filed: Oct. 3, 1986

[30] Foreign Application Priority Data

Oct. 3, 1985 [DE] Fed. Rep. of Germany ....... 3535287

[51] Int. Cl.$^4$ .............................................. B60G 17/08
[52] U.S. Cl. .................................... 188/299; 188/311; 188/317; 251/129.05; 280/714
[58] Field of Search ............... 188/299, 311, 313, 316, 188/163, 314, 315, 317, 318, 319, 320, 322.13; 251/129.05; 137/487.5; 280/707, 71 L

[56] References Cited

U.S. PATENT DOCUMENTS

| | | | |
|---|---|---|---|
| 3,219,095 | 11/1965 | Nilsson | 251/129.05 |
| 3,446,473 | 5/1969 | Barker | 251/129.05 |
| 3,476,128 | 11/1969 | Barker | 251/129.05 |
| 4,313,465 | 2/1982 | Holzem et al. | 251/129.05 |
| 4,313,529 | 2/1982 | Kato et al. | 188/299 |
| 4,589,528 | 5/1986 | Axthammer et al. | 188/299 X |

FOREIGN PATENT DOCUMENTS

| | | |
|---|---|---|
| 1242945 | 6/1967 | Fed. Rep. of Germany . |
| 1405781 | 6/1970 | Fed. Rep. of Germany . |
| 2119531 | 11/1971 | Fed. Rep. of Germany . |
| 0112820 | 7/1983 | Japan .................................. 188/299 |
| 0174773 | 10/1983 | Japan .............................. 251/129.05 |
| 2164120 | 3/1986 | United Kingdom . |

Primary Examiner—George E. A. Halvosa
Assistant Examiner—Matthew C. Graham
Attorney, Agent, or Firm—Nils H. Ljungman

[57] ABSTRACT

An arrangement for varying the damping of a suspension component such as a vibration damper, gas spring or hydro-pneumatic suspension. In one embodiment, an electronic system is mounted in association with the cylinder of the suspension component to form a variable damping system which, with the aid of other circuitry, varies the damping system of the piston. A vibration damping system for motor vehicles, in which there is a damping element, which has a work cylinder, is divided into two work chambers by a piston. This cylinder contains a damping medium. There is an electronically-controlled bypass valve disposed parallel to the work cylinder. A desired, variable damping force can thereby be achieved in the decompression and compression stage, between two fixed and specified fundamental curves, by controlling the current sent to an electromagnet. To achieve a damping force at a given piston velocity, the bypass is correspondingly controlled by the electromagnet, by means of a computed pulse width repetition rate.

18 Claims, 6 Drawing Sheets

VIBRATION DAMPER FOR MOTOR VEHICLES HAVING AN ARRANGEMENT FOR VARYING DAMPING THEREOF

BACKGROUND OF THE INVENTION

1. Field of the Invention

The invention relates generally to an arrangement for varying the damping of a piston in hydraulic, pneumatic or hydro-pneumatic assemblies, such as vibration dampers, gas springs and hydro-pneumatic suspensions and, more particularly, to vibration dampers having the piston arranged to slide axially by means of a piston rod in a cylinder filled with at least one damping medium.

2. Description of the Prior Art

The prior art includes hydraulic shock absorbers, such as those disclosed in Federal Republic of Germany Patent Publication Published for Opposition Purposes No. DE-AS 12 42 945 and No. DE-AS 14 05 781, and French Patent No FR-PS 11 75 293, whose damping characteristics can be adjusted electromagnetically by changing the flow of the hydraulic damping medium through the damping valves. In these cases, there are two bypass connections, the first of which generally serves to regulate the damping force in the decompression stage in relation to the compression stage. To change the damping force to suit different road conditions, there is an additional bypass connection in the decompression stage, in which there is an electromagnetically-controlled valve. A disadvantage of this arrangement is that there is no way to control the damping force in the compression stage. In addition, with an electromagnet which can be turned either on or off, it is only possible to achieve a corresponding upper and lower damping force curve. In these systems, it is impossible to achieve intermediate values.

The prior art also includes hydraulic adjustable shock absorbers, such as in Federal Republic of Germany Laid Open Patent Application No. DE-OS 21 19 531, in which there is a first damping element and also a line equipped with a control valve. A control valve and a damping element are located separately in a closed loop. The setting of the control valve is done either manually or by the action of one of the vehicle mechanisms. A disadvantage of this arrangement is that when the control valve is activated, it is again only possible to achieve an upper and a lower damping force curve, whereby any damping values which may be desired between these two limit values cannot be achieved merely by turning on and off the control valve. Beyond the specified limits, there is no variability. The above-cited patent publications are incorporated herein by reference as if the contents thereof were fully set forth herein.

OBJECT OF THE INVENTION

The object of the invention is to control and activate the bypass valve of a shock absorber electronically, so that a desired, variable damping force can be produced both in the decompression and also in the compression stage between two fixed fundamental curves by means of the current sent to the electromagnet, and whereby, in addition, brief switching intervals are assured by the configuration of the valve body.

SUMMARY OF THE INVENTION

To achieve this object and other objects, the inventive embodiments propose that the damping force, between an upper limit when the damping valve is not energized and a lower limit when the damping valve is energized, can be adjusted by the selection of a pulse width repetition rate and that the damping force is equal to the upper damping force minus the difference between the upper damping force and the lower damping force, multiplied by the pulse width repetition rate.

The system, according to an embodiment of the invention, comprises at least one hydraulic, adjustable shock absorber which, by means of a work piston fastened to a piston rod, divides the work cylinder into two work chambers filled with damping fluid. Connected in parallel with the work cylinder, there is a damping valve located in a bypass, comprising of an axially-movable, controllable valve body working together with a passage, exhibiting an electromagnet and activated by a suitable electronic system. Depending on the switching position of the valve body, the shock absorber produces an upper or lower damping force in relation to the current piston velocity.

An advantage with this configuration is that a damping force adjustment is achieved by modulation of the duration of the energization pulse in the bypass channel. In other words, as a result of a change of the pulse width repetition rate between the opening and closing of the valve body, the damping force can be effectively varied between two fixed defined fundamental curves. The fundamental curves of the damping force are thereby determined by the mechanical components, such as the damping valves and the cross section of the bypass. The pulse width repetition rate is thereby the ratio between the time the electromagnet is energized and a constant time period.

If a damping force is desired at a specified piston velocity geometrically exactly halfway between the upper and the lower damping force curve, a pulse width repetition rate of 50% is required, that is, within a determined time constant, the valve body will remain open one-half of the time, and must remain closed the other half of the time. The adjustment precision for the effective desired damping rate lying between the limit values is thereby a function of the level of the clock frequency of the circuit connected to and controlling the electromagnet. In other words, there must be an appropriate resolution and, consequently, the smaller the time constant which is selected and which can be put to practical use, the better the resolution which can be achieved.

In accordance with another important feature, there are at least two damping valves in parallel in the bypass. Such an arrangement has the advantage of reducing the damping force discontinuity between the upper and lower limit values. When two damping valves are used, for example, with a corresponding electronic control, the regulating field which can be influenced by the pulse width modulation can be divided into three partial fields, each with reduced damping force discontinuities. The three regulating fields are produced by the four possible damping force curves. These four damping force curves result from the possible combinations of positions of the two damping valves, whereby, for example, two valve bodies can be closed, the first valve open and the second valve closed, the second valve open and the first valve closed, and, as a fourth possibility, the two valve bodies of both damping valves can be open. As a result of this switching combination, the corresponding damping force curves are achieved, so that damping forces are achieved in these three individual regulating fields by activating one or both of the valves simultaneously.

In one configuration of the invention, the valve body exhibits a small sealing surface.

A particularly advantageous embodiment provides that the inside diameter of the sealing surface is smaller than the outside diameter of the valve body. The outside diameter of the sealing surface can also be larger than the outside diameter of the valve body.

An advantage here is that a stable closing position of the damping valve is achieved, assisted to a minor extent by the closed position of the damping valve. When the valve body is open, the pressure determined by the damping valve of the bypass acts via the external surface of the valve body, and thus assists the closing process of the valve body. The geometric ratios of the valve body mean that very brief switching intervals are possible. By harmonizing the partial surfaces of the entire valve body sealing surface, it becomes possible to exercise a hydraulically favorable action on the switching times. This hydraulic assist also makes possible the use of a valve body return spring with very low return forces. The available magnetic force on the armature of the electromagnet which controls the damping valve can therefore be increased, which is important for the switching interval of the electromagnet.

To sum up, the invention resides broadly in a vibration damper for motor vehicles. The damper comprises a cylinder assembly having an arrangement for varying damping of a piston assembly disposed therein. The piston assembly divides the cylinder into at least two chambers, each for containing damping fluid. The vibration damper comprises an apparatus for throttling the damping fluid when the damping fluid moves from one of the chambers into another. The piston assembly has a piston rod and piston. The piston rod has a first apparatus for attachment of the piston rod at one end thereof. The cylinder assembly has a second apparatus for attachment at a portion thereon other than the first apparatus for attachment at the piston rod. The vibration damper has an apparatus for bypassing damping fluid and an arrangement for accepting bypassed damping fluid. The bypassing apparatus is disposed to bypass the damping fluid from one of the damping fluid-containing chambers to the accepting arrangement. The bypassing apparatus includes a damping valve arrangment for regulating flow of the damping fluid in the bypassing apparatus. The valving includes an electromagnetically-displaceable component for effecting a first flow cross section and a second flow cross section in the valving. An electromagnet varies the cross section flow of the valving between the first and second flow cross sections by displacing the electromagnetically-displaceable component. The electromagnet has an arrangement for connection to electronic controlling apparatus. The electronic controlling apparatus comprises an arrangement for generating an electrical signal which is repetitive and has a variable pulse width. The arrangement for generating provides a signal to vary the cross section of the flow cross section of the valving periodically, whereby a damping on the piston assembly provides a damping between the damping produced by the first flow cross section and the damping produced by the second flow cross section.

An embodiment of the invention includes a cylinder assembly. An electrical signal generating means includes circuitry for generating a repetitive pulse of a given frequency and circuitry for varying an on-time of the pulse, thereby producing a damping force (Fx) on the piston assembly which can be adjusted by selecting the pulse width repetition rate (Tv) between an upper force (Fo) when the damping valve is not energized, and a lower force (Fu) when the damping valve is always energized, and that the damping force (Fx) is equal to the upper damping force (Fo$_x$) minus the difference between the upper damping force (Fo$_x$) and the lower damping force (Fu$_x$), multiplied by the pulse width repetition rate (Tv).

BRIEF DESCRIPTION OF THE DRAWINGS

Preferred embodiments are schematically illustrated in the drawings, in which.

DESCRIPTION OF THE PREFERRED EMBODIMENTS

Figure 1:
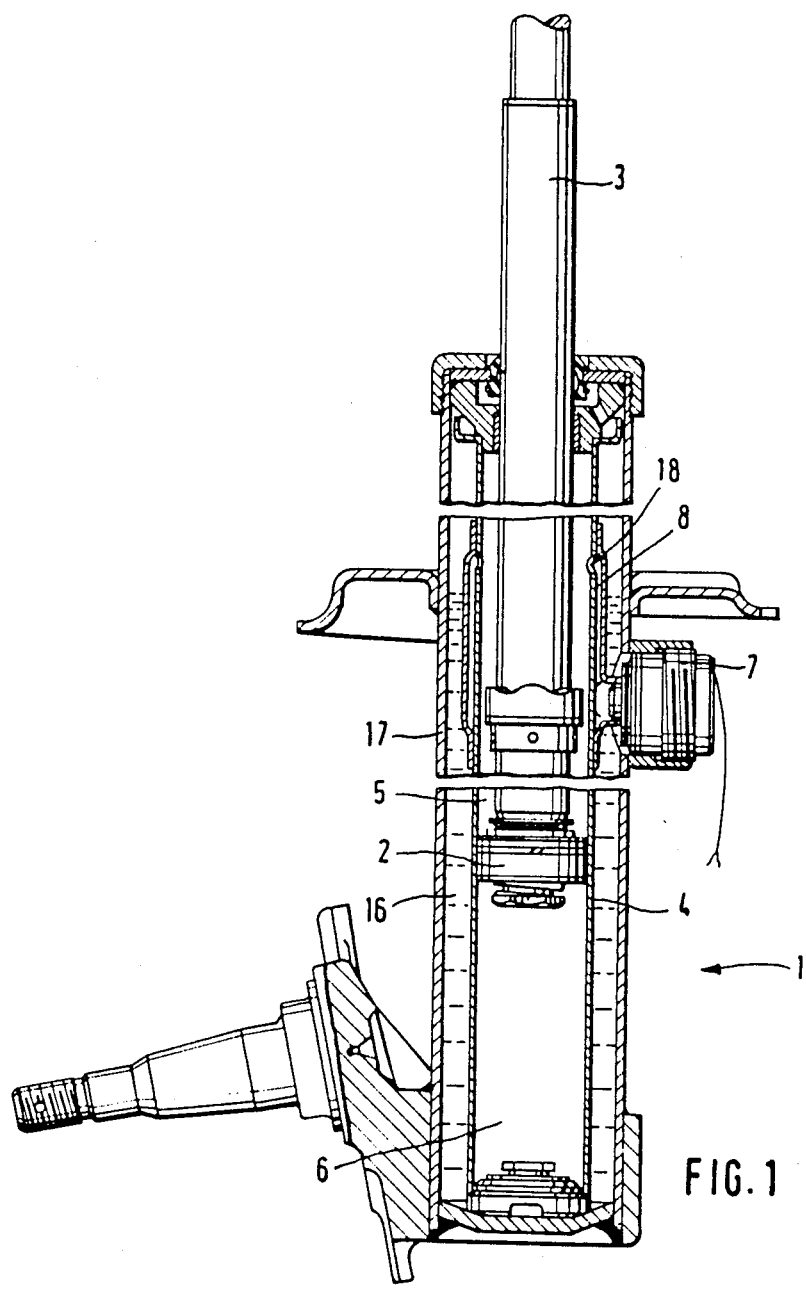
FIG. 1 shows a hydraulic shock absorber with a damping valve, in partial cross section.

The vibration damping system illustrated in FIG. 1 is a shock absorbing strut in a double-tube model. The theory of the invention, however, can also be applied in other types of shock absorbers, such as single-tube shock absorbers, gas shock absorbers, etc. The shock-absorbing strut 1 illustrated in FIG. 1 consists essentially of the work piston 2, the piston rod 3 and the work cylinder 4. The work piston 2 divides the work cylinder 4 into the upper work chamber 5 and the lower work chamber 6. The work piston 2 is also equipped with damping valves (not shown) which are well known in the prior art. In the floor of the work cylinder 4, there are other valves, over whose cross sections the volume displaced by the piston rod 3 is displaced into the equalization chamber 16. The equalization chamber 16 is formed by the wall of the work cylinder 4 and the inside wall of a jacket 17.

There is a flow connection into the equalization chamber 16 from the upper work chamber 5 via the boring 18, the bypass 8 and the damping valve 7. In this flow connection, the damping valve 7 controls a variable fluid circulation.

Figure 2:
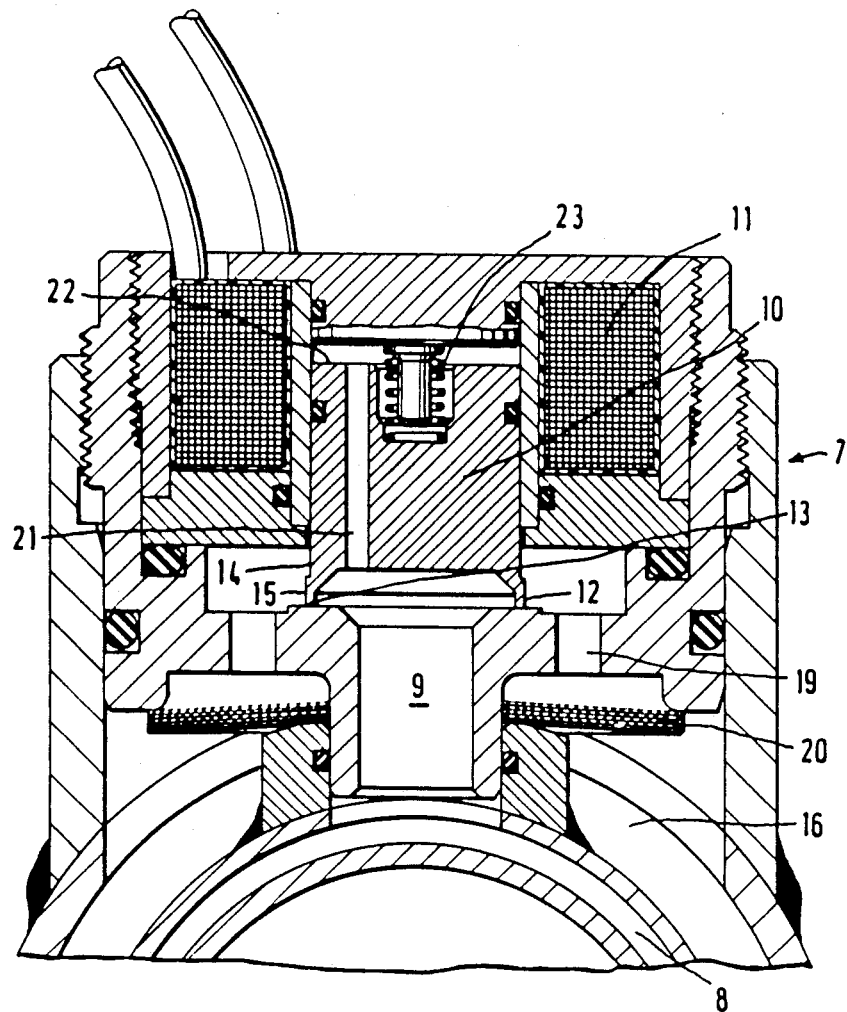
FIG. 2 shows a damping valve with an electromagnet in section, and in detail.

FIG. 2 shows a detail of a damping valve 7 whereby, starting from a bypass channel 8, the damping fluid travels through a passage 9, past a valve body 10, via borings 19 on a spring washer valve 20 into an equalization chamber 16. The valve body 10 is also the armature for an electromagnet 11. The valve body 10 is equipped, on its side facing the passage 9, with a sealing surface 12, which seals it against the passage 9. The boring 21 of the valve body 10 assures that, on the back side of the valve body 10, an appropriate work pressure is accumulated on an end surface 22. The sealing surface 12 of the valve body 10 exhibits an inside diameter 13, the surface of which is smaller than the end surface of the end 22, so that the work pressure of the shock absorber exerts a slight auxiliary closing force on the valve body 10. By achieving an appropriate relationship between the surface area of the end 22 and the area of the inside diameter 13, it is possible to exercise a favorable hydraulic action on the switchover intervals of the electromagnet. This hydraulic assist of the valve body 10 also makes possible the use of a switch valve return spring 23 with very low return forces. That increases the available magnetic force at the armature (valve body 10) of the damping valve 7, which is important for the switchover interval.

When the valve body 10 is open, the pressure determined by the damping valve 20 of the bypass valve acts via the surface formed by an outside diameter 14 and 15 of the valve body 10 as an auxiliary force on the closing process of the valve body 10 of the damping valve 7.

Figure 3:
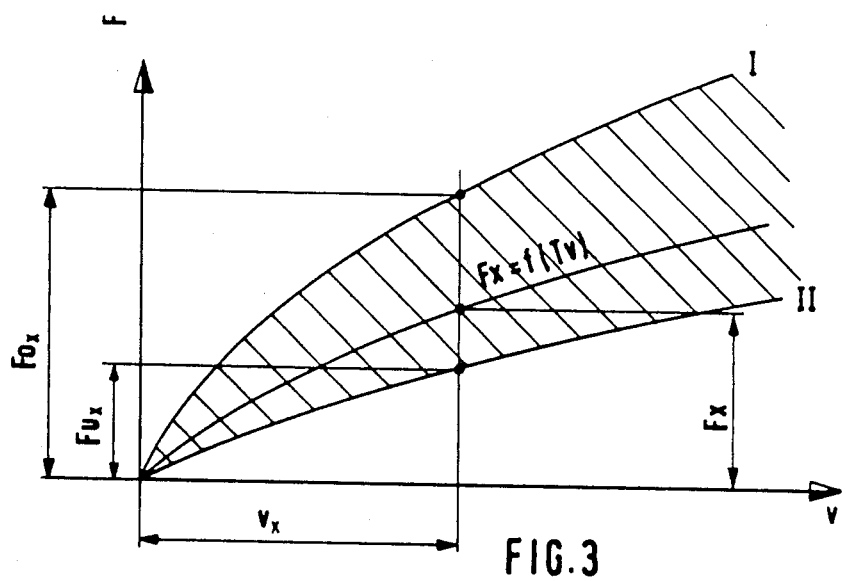
FIG. 3 shows a force-velocity diagram of an adjustable shock absorber with a bypass valve.

FIG. 3 is a force-velocity diagram of the shock-absorbing strut illustrated in FIG. 1. The damping force is plotted in relation to the piston velocity. Curve I represents the damping curve when the valve body 10 is closed. Curve II relates to the open valve body. Between the Curve I and the Curve II, there is a regulating field, which covers damping forces which can be achieved when the electromagnet 11 is correspondingly activated. If, for example, the damping force Fx is achieved at a piston velocity Vx, then a corresponding pulse width repetition rate is to be set, as shown in FIG. 4.

Figure 4:
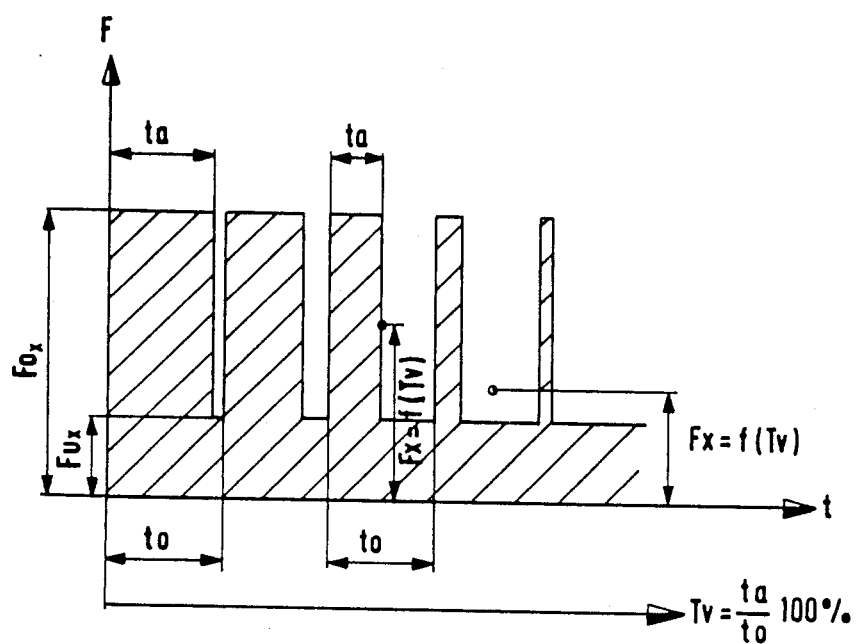
FIG. 4 is the diagram of a damping force action at the point Vx (piston velocity)

FIG. 4 shows one example for influencing the damping force at point Vx. It has been assumed, to make the diagram easier to understand, that Vx is constant over a rather long period of time t. The damping force curve $Fo_x$ is a point from the fundamental Curve I in FIG. 3. The damping force $Fu_x$ represents, at the same point Vx, a point of the fundamental Curve II of the curve shown in FIG. 3. In this diagram, the pulse width repetition rate is an important criterion. The pulse width repetition rate is defined as:

$$Tv = ta/to$$

In percentage form:

$$Tv\ (\%) = ta/to \cdot 100$$

With a pulse width repetition rate of 100%, the fundamental Curve I is reached, since the bypass via the valve body 10 is closed. The closing time is specified at 100% during a time constant (to). If, at a pulse width repetition rate of 0, the bypass 8 via the valve body 10 is opened for the entire time of the time constant (to), then the lower fundamental Curve II applies. Now, if for example, a geometric mean value is achieved exactly halfway between the upper fundamental Curve I and the lower fundamental Curve II, then a pulse width repetition rate of 50% is necessary. With a pulse width repetition rate of 50%, one-half of the time constant (to), the valve body 10 is closed, and the other one-half of the time constant, it is open.

FIG. 4 shows hat the damping force Fx can be varied between $Fo_x$ and $Fu_x$ as a function of the selection of the pulse width repetition rate Tv. The variation follows the formula:

$$Fx = Fo_x - (Fo_x - Fu_x) \cdot Tv$$

Where:
Fx = the damping force to be achieved;
$Fo_x$ = the upper damping force at a piston velocity Vx;
$Fu_x$ = lower damping force at a piston velocity Vx; and
Tv = pulse width repetition rate.

According to this formula, any other desired curve between these extreme fundamental curves can be achieved, by solving the formula for the pulse width repetition rate, and using the corresponding value to control the electromagnet 11. It can be seen that the regulating precision for the electromagnet for the value lying between the upper and the lower limit of the effective damping force Fx is a function of the level of the clock frequency of the electromagnet.

The idealized form of the force curve F over the time t shown in FIG. 4 does not occur in a practical application, since the construction and axle fastening elements of the shock absorber, the tires and other bearings in the geometry of the embodiment produce a rounded curve form, because of their elastic behavior.

Figure 5:
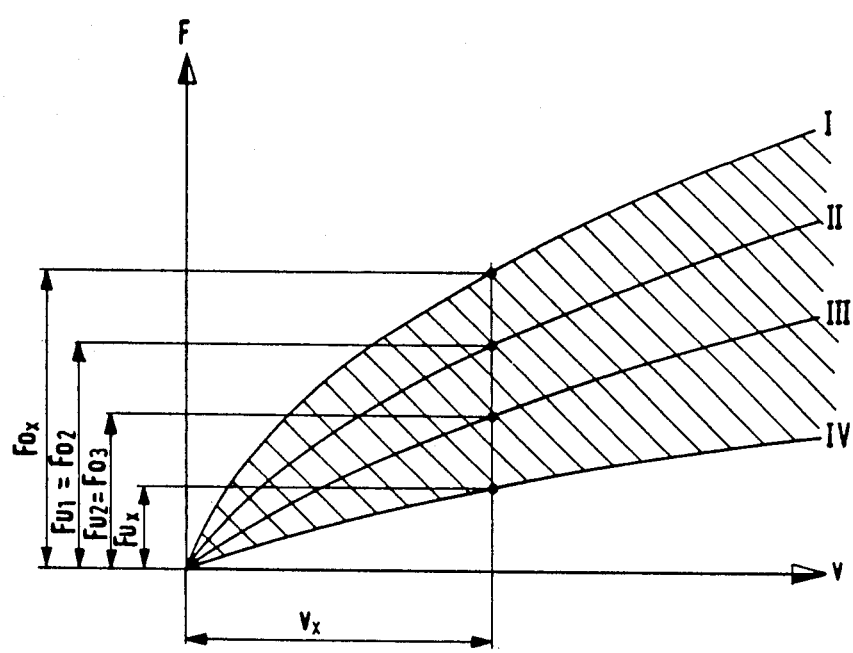
FIG. 5 is another force-velocity diagram with four different fundamental curves and, in relation to them, three corresponding partial regulating fields.

The force-velocity diagram shown in FIG. 5 includes curves which are obtained when, for example, two damping valves 7 are used. The goal of this application is to reduce the damping force discontinuity between Fo and Fu. When two damping valves 7 are used, the regulating field which can be affected by pulse width modulation can be divided into three partial fields, with reduced damping force discontinuities. The damping force fundamental Curves I to IV are achieved, as a function of the switching combination of the damping valves 7.

In the fundamental Curve I, both valve bodies 10 are closed. The fundamental Curve II shows a first valve body 10 open and the second valve body closed. The fundamental Curve III shows that the second valve body 10 is open and the first valve body, on the other hand, is closed. In the fundamental Curve IV, both valve bodies 10 are opened. This switching combination yields the ability to vary the curves in the individual partial regulating fields.

The partial regulating field 1 is covered by electronic activation of the electromagnet 11 of the first damping valve 7, while the second damping valve 7 remains closed. The partial regulating field 2 covers situations in which both damping valves 7 are operated by means of their electromagnets 11, whereby the signals run inverse to one another. In the partial regulating field 3, the second damping valve 7 is open, while the first damping valve 7 acts via its electromagnet on the valve body 10. In this diagram, too, the desired damping force Fx at the velocity Vx is achieved via the above-mentioned formula:

$$Fx = Fo_x - (Fo_x - Fu_x) \cdot Tv$$

The setting of the damping forces is therefore always guaranteed in a partial regulating field, and extreme damping force discontinuities can thereby be avoided.

Figure 6:
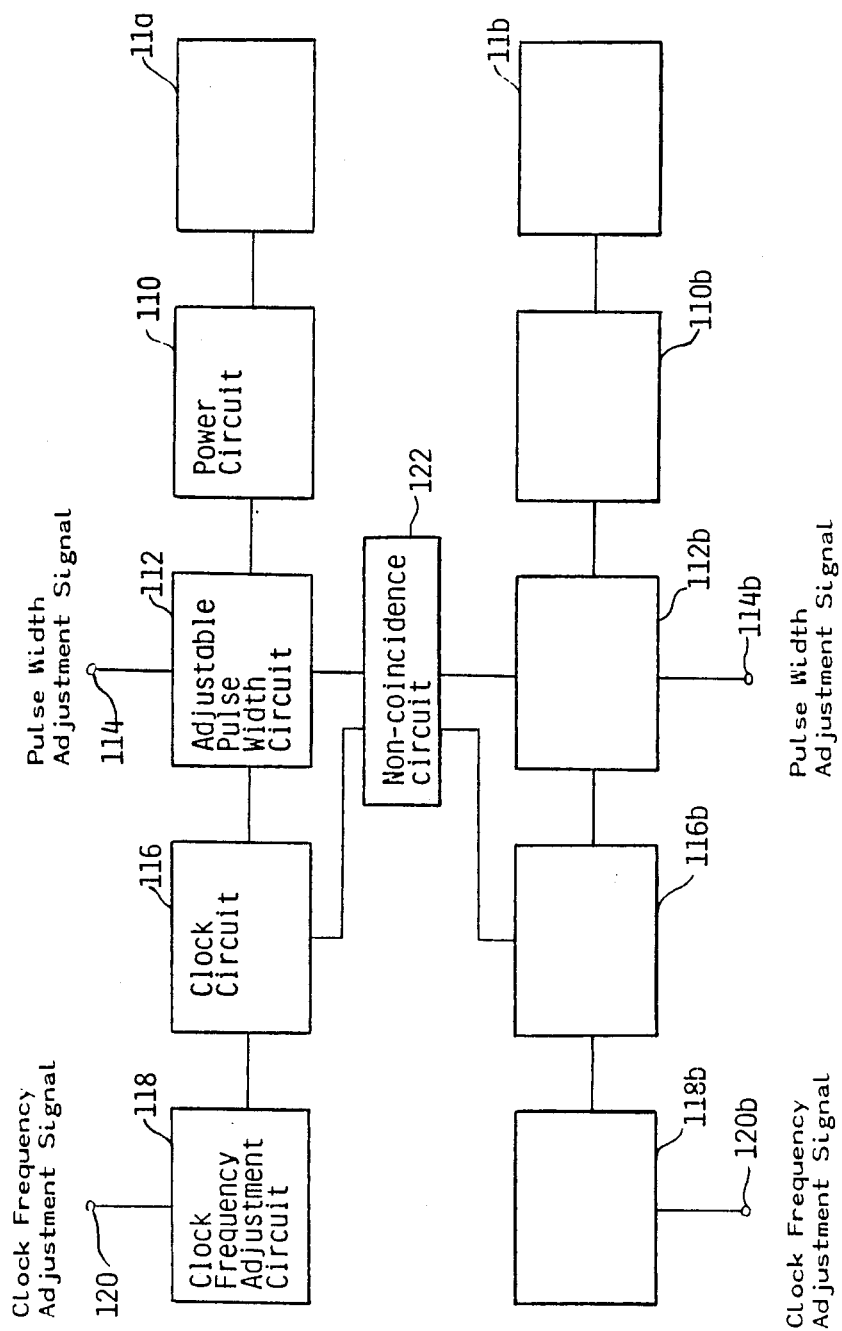
FIG. 6 shows a circuit for the operation of the electromagnets of the damping valve according to an embodiment of the invention.

FIG. 6 shows a circuit for the operation of the electromagnets 11 of the valve body 10. In FIG. 6, two separate electromagnets 11a and 11b are shown, each being associated with a different valve body 10. When the circuitry as shown in FIG. 6 operates, it corresponds to the operation which has been described hereinabove related to FIG. 5. If only one valve body 10 with a single electromagnet 11 is to be used, only one of the two circuits shown in FIG. 6 need be used.

As shown in FIG. 6, an electromagnet 11a is connected to a power circuit 110, which provides the voltage pulses for the activation of electromagnet 11a in accordance with the operation as shown in FIG. 4. The power circuit 110 is controlled by an adjustable pulse width circuit 112, which provides signals for the turning on and turning off of the power circuit 110, thereby providing the voltage pulses to the electromagnet 11a. The voltage pulses from the power circuit 110 may also be current pulses or a combination of current and voltage pulses. The pulse width of the adjustable pulse width circuit 112 is adjusted by an external signal which may enter preferably at a terminal 114 of the adjustable pulse width circuit 112. A clock circuit 116 is connected to the adjustable pulse width circuit 112 in order to provide a clock pulse for the adjustable pulse width circuit 112 for the starting of each and every pulse, preferably. In order to adjust the frequency of the clock circuit 116, if so desired, which frequency may be typically in the order of a few Hertz, for example, 2 to 3 Hertz to about 10 to 25 Hertz or even higher, depending upon the design of the electromagnet 11a, a clock adjustment circuit 118 is connected to the clock circuit 116, whereby the clock frequency may be altered depending upon the desires of the driver of the motor vehicle having the vibrational damping system of the present invention, or depending upon other sensors which are described in U.S. Pat. Nos. 4,577,509; 4,587,850; application Ser. Nos. 700,451, filed on Feb. 11, 1985, entitled "Vibration Damper Apparatus"; application Ser. No. 730,770, filed on May 3, 1985, entitled "Hydraulic Damping Rubber Engine Mount"; application Ser. No. 735,452, filed on May 17, 1985, entitled "Adjustable Hydraulic Shock Absorber"; application Ser. No. 736,803, filed on May 22, 1985, entitled "Collision Damper Having a Damping Piston and a Deformable Tube Connected Thereto"; application Ser. No. 766,871, filed on Aug. 16, 1985, entitled "Apparatus for the Determination of the Distance Traveled by a Piston in a Cylinder"; application Ser. No. 778,606, filed on Sept. 20, 1985, entitled "Hydraulic Adjustable Shock Absorber" and application Ser. No. 772,316, filed on Sept. 4, 1985, entitled "Hydraulic Vibration Damper Having Adjustable Damping Valve" for the adjustment of the clock adjustment signal, which are incorporated by reference as if the entire contents thereof were fully set forth herein. A computer such as that shown in U.S. Ser. No. 778,606, may be used to adjust the signals shown to come from outside the circuitry of FIG. 6. Also, the pulse width adjustment signal at the terminal 114 may also be adjusted by these same ways as the clock adjustment signal entering a terminal 120 of the clock adjustment circuit. Circuits analogous to the circuits 110 through 118 may be connected to a second electromagnet 11b of the second valve body 10. These circuits which are designated by the reference numerals 110b through 118b, correspond to the circuits as originally described above with regard to the circuits connected to the electromagnet 11a. There also may be interconnections between the adjustable pulse width circuits in order that both electromagnets do not open up simultaneously, or that under special conditions, they will open up simultaneously. Additional circuits such as a pulse width adjustment signal at 114 and 114b may be interconnected so that the pulse widths of each electromagnet 11a and 11b are different. Also, the clock circuits may wish to have different clock period starting times in order that not both of the electromagnets 11a and 11b open up and close simultaneously for which purpose a non-coincidence circuit 122 is preferably provided, which is preferably connected to the clock circuits 116 and 116b and to the adjustable pulse width circuits 112 and 112b whereby the initial edges of the pulses are non-coincident with one another. The non-coincidence circuit 122 can also adjust the falling edge of the pulses to assure non-coincidence of these as well.

Also, one set of circuits 110 through 118 or 110b through 118b may be shut down and only one set may be activated. In the event that only one electromagnet is used in an installation, only one set of circuits 110 through 118 need be provided.

Figure 7:
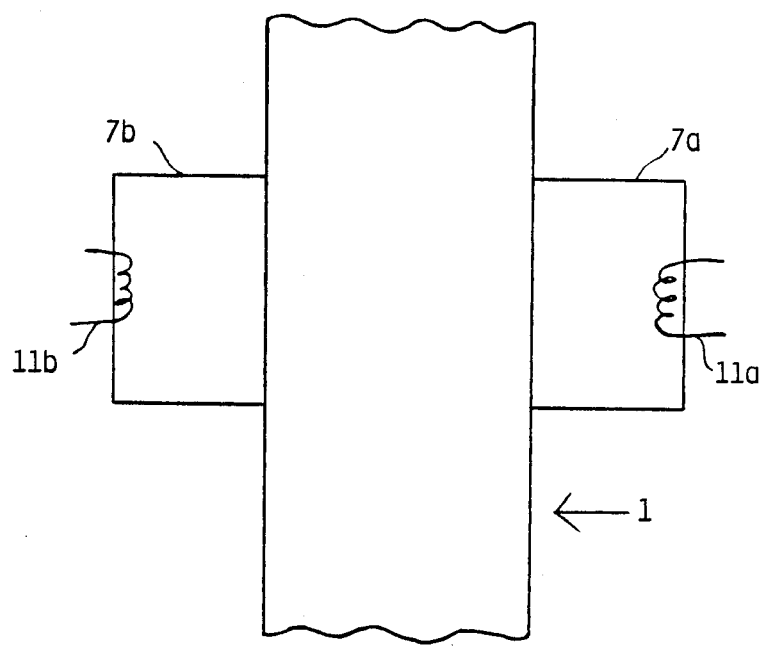
FIG. 7 shows the hydraulic shock absorber of FIG. 1 with two damping valves.

Going now to FIG. 7, the shock absorber strut 1 (illustrated in FIG. 1) is shown with a first damping valve 7a and a second damping valve 7b connected thereto. The damping valves 7a and 7b, each having an electromagnet 11a and 11b corresponding to those in FIG. 6, are substantially identical to the damping valve 7 shown in FIG. 1.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid;

means for accepting bypassed damping fluid;

said by passing means being disposed to bypass said damping fluid from one of said damping fluid-containing chambers to said accepting means;

said bypassing means including damping valve means for regulating flow of said damping fluid in said bypassing means;

said valving means including:

an electromagnetically-displaceable component for effecting a first flow cross section and a second flow cross section in said valving means; and electromagnetic means for varying the cross section flow of said valving means between said first and second flow cross sections by displacing said electromagnetically-displaceable component, said electromagnetic means having means for connection to electronic controlling means;

said electronic controlling means comprising:

means for generating an electrical signal which is repetitive and has a variable pulse width; and said means for generating, providing a signal to vary the cross section of said flow cross section of said valving means periodically, including circuitry for generating a repetitive pulse of a given frequency and circuitry for varying an on-time of said pulse from a minimum pulse width to a maximum pulse width for varying said damping of said piston over a substantially continuous range between a minimum and a maximum value, whereby said piston assembly provides a resultant damping being between the damping produced by said first flow cross section and the damping produced by said second flow cross section.

2. The vibration damper according to claim 1, including circuitry for varying said given frequency.

3. The vibration damper according to claim 1, wherein said valving means includes a first damping valve and a second damping valve in said bypassing means, and wherein said electronic signal generating means includes separate circuitry for generating a repetitive pulse of a given frequency and circuitry for varying an on-time of said pulse from a minimum pulse width to a maximum pulse width for varying said damping between a minimum and a maximum value separately for each of said two valves.

4. The vibration damper according to claim 3, including circuitry for varying said given frequency.

5. The vibration damper according to claim 3, wherein said first flow cross section of said valving means is substantially a closed cross section through which substantially no fluid is flowable.

6. The vibration damper according to claim 3, including circuitry for starting initial edges, of said pulses of a first circuit of said circuitry for generating a repetitive pulse of a given frequency and circuitry for varying an on-time of said pulse from a minimum pulse width to a maximum pulse width for varying said damping between a minimum and a maximum value for a first of said two values, at a different time from initial edges of pulses of a second circuit of said circuitry for generating a repetitive pulse of a given frequency and circuitry for varying an on-time of said pulse from a minimum pulse width to a maximum pulse width for varying said dampling between a minimum and a maximum value for a second of said two valves, whereby shocks to said piston assembly are minimized.

7. The vibration damper according to claim 6, wherein said first flow cross section of said valving means is substantially a closed cross section through which substantially no fluid is flowable.

8. The vibration damper according to claim 1, wherein said valving means includes a first damping valve and a second damping valve in said bypassing means, and wherein said electronic signal generating means includes separate circuitry for generating a repetitive pulse of a given frequency and circuitry for varying an on-time of said pulse from a minimum pulse width to a maximum pulse width for varying said damping between a minimum and a maximum value for each of said two valves.

9. The vibration damper according to claim 1, wherein said first flow cross section of said valving means is substantially a closed cross section through which substantially no fluid is flowable.

10. The vibration damper according to claim 9, wherein said electromagnetically displaceable component is axially displaceable in an axial direction and has a cross sectional area transverse to said axial direction; said electromagnetically displaceable component has a sealing surface which is substantially smaller in surface area than said cross sectional area of said displaceable component transverse to said axial direction.

11. The vibration damper according to claim 10, wherein said sealing surface has an inside diameter and said axially displaceable component has an outside diameter; and said inside diameter of said sealing surface is smaller than the outside diameter of said axially displaceable component.

12. The vibration damper according to claim 11, wherein said sealing surface has an outside diameter; and said outside diameter of said sealing surface is greater than the outside diameter of said axially displaceable component.

13. The vibration damper according to claim 1, wherein said electrical signal generating means includes circuitry for generating a repetitive pulse of a given frequency and circuitry for varying an on-time of said pulse, thereby producing a damping force (Fx) on said piston assembly which can be adJusted by selecting the pulse width repetition rate (Tv) between an upper force (Fo) when the damping valve is not energized, and a lower force (Fu) when the damping valve is always energized, and that the damping force (Fx) is equal to the upper damping force ($Fo_x$) minus the difference between the upper damping force ($Fo_x$) and the lower damping force ($Fu_x$), multiplied by the pulse width repetition rate (Tv).

14. The vibration damper according to claim 13, wherein said first flow cross section of said valving means is substantially a closed cross section through which substantially no fluid is flowable.

15. The vibration damper according to claim 13, wherein said valving means includes a first damping valve and a second damping valve in said bypassing means, and wherein said electronic signal generating means includes separate circuitry for generating a repetitive pulse of a given frequency and circuitry for varying an on-time of said pulse from a minimum pulse width to a maximum pulse width for varying said damping between a minimum and a maximum value separately for each of said two valves.

16. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:
   means for throttling said damping fluid when said damping fluid moves from one of said chambers into another;
   said piston assembly having a piston rod and piston;
   said piston rod having a first means for attachment of said piston rod at one end thereof;
   said cylinder assembly having second means for attachment at a portion thereon other than said first means for attachment at said piston rod;
   means for bypassing damping fluid;
   means for accepting bypassed damping fluid;
   said bypassing means being disposed to bypass said damping fluid from one of said damping fluid-containing chambers to said accepting means;
   said bypassing means including damping valve means for regulating flow of said damping fluid in said bypassing means;
   said valving means including:
   an electromagnetically-displaceable component for effecting substantially solely a first flow cross section and a second flow cross section in said valving means; and electromagnetic means for switching over the cross section flow of said valving means between said first and second flow cross sections by displacing said electromagnetically-displaceable component, said electromagnetic means having means for connection to electronic controlling means;

said first flow cross section being a closed valve cross section through which substantially a zero amount of damping fluid is flowable therethrough;

said second flow cross section being a substantially fully open valve opening;

said electronic controlling means comprising:

means for generating an electrical signal which is repetitive and has a variable pulse width;

said means for generating providing a signal to vary the cross section of said flow cross section of said valving means periodically substantially solely between said first flow cross section and said second flow cross section, whereby said piston assembly provides a resultant damping being between the damping produced by said first flow cross section and the damping produced by said second flow cross section over a substantially continuous range.

17. The vibration damper according to claim 16, wherein said electromagnetically-displaceable component comprises:

a valve body with a sealing surface; and valve seating means for being sealed by said sealing surface of said valve body;

said valve body having a second surface on the end thereof opposite said sealing surface;

a portion of the end with the sealing surface having a surface area which is less than the surface area of said second surface, whereby hydraulic action of said dampling fluid assists in switchover of said valve body during switching between said first and second flow cross section, and whereby a closing force is generated by said damping medium when said valve body is in the closed position against said valve seating means.

18. A method of operating a vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid;

means for accepting bypassed damping fluid;

said bypassing means being disposed to bypass said damping fluid from one of said damping fluid-containing chambers to said accepting means;

said bypassing means including damping valve means for regulating flow of said damping fluid in said bypassing means;

said valve means including:

an electromagnetically-displaceable component for effecting substantially solely a first flow cross section and a second flow cross section in said valving means; and electromagnetic means for switching over the cross section flow of said valving means between said first and second flow cross sections by displacing said electromagnetically-displaceable component, said electromagnetic means having means for connection to electric controlling means;

said first flow cross section being a closed valve cross section through which substantially a zero amount of damping fluid is flowable therethrough;

said second flow cross section being a substantially fully open valve opening;

said method comprising:

generating an electrical signal which is repetitive and has a variable pulse width for providing said signal having the variable pulse width for varying the average cross section of said flow cross section of said valving means, and thus the damping of said vibration damper, by moving said displaceable component periodically substantially solely between said first, substantially fully closed, flow cross section and said second, substantially fully open, flow cross section, whereby said piston assembly provides a resultant damping being between the damping produced by said first, substantially fully closed, flow cross section and the damping produced by said second, substantially fully open, flow cross section over a substantially continuous range.

* * * * *